United States Patent [19]

Rennaker

[11] Patent Number: 5,219,001

[45] Date of Patent: Jun. 15, 1993

[54] PIPE REPAIR CLAMP

[75] Inventor: Wayne E. Rennaker, Manchester, Ind.

[73] Assignee: The Ford Meter Box Company, Inc., Wabash, Ind.

[21] Appl. No.: 743,725

[22] Filed: Aug. 12, 1991

[51] Int. Cl.$^5$ ............................................. F16L 55/16
[52] U.S. Cl. ........................................ 138/99; 138/97
[58] Field of Search ................ 138/97, 98, 99, 110; 29/402.08, 402.12, 402.14, 402.15

[56] References Cited

U.S. PATENT DOCUMENTS

| | | | |
|---|---|---|---|
| 2,897,568 | 8/1959 | Hoke | 138/99 |
| 3,241,207 | 3/1966 | Skinner | 138/99 |
| 3,470,916 | 10/1969 | Halterman et al. | 138/99 |
| 3,487,856 | 1/1970 | Turner et al. | 138/99 |
| 3,700,008 | 10/1972 | Hackman | 138/99 |
| 4,676,275 | 6/1987 | Hancock et al. | 138/99 |

Primary Examiner—James E. Bryant, III

Attorney, Agent, or Firm—Pearne, Gordon, McCoy & Granger

[57] ABSTRACT

A pipe repair clamp for repairing damaged piping is disclosed. The clamp includes a hollow, cylindrical slit compression gasket having axially extending end portions. The end portions define a relatively small, axially extending gap when the gasket is initially installed on a pipe to be repaired. An armor sleeve is mounted on the outside surface of a first portion of the gasket and has axially extending ends arcuately spaced unequal distances from the end faces of the gasket. A clamping band encircles the gasket and the sleeve so that tension applied to the band will exert compressive force on the gasket and sleeve. The band is in contact with a second portion of the gasket when the band and gasket are initially installed on the pipe and out of contact with third and fourth portions of the gasket. The fourth portion of the gasket includes at least one of the end portions which terminate in the end faces so that the gap will be closed and the third and fourth portions will be substantially eliminated when compressive force is exerted by the band.

8 Claims, 2 Drawing Sheets

PIPE REPAIR CLAMP

BACKGROUND OF THE INVENTION

This invention relates to repair clamps for pipelines and, more particularly, to a repair clamp for small diameter pipes which will effect a complete circumferential seal around a portion of the pipe to be repaired.

A typical pipe repair coupling for small diameter pipes includes a cylindrical elastomeric gasket having an axial split therein which is adapted to be placed over the portion of the pipe to be repaired. A clamping band exerts compressive forces on the gasket to seal the gasket against the pipe. The clamping band is a flexible steel band having lugs at its ends which are drawn toward each other by a nut and bolt assembly to apply tension to the band. An arcuately shaped armor sleeve is provided which conforms to the shape of the gasket and which serves to cover at least that portion of the gasket which is not directly engaged by the clamping band so that the compressive forces are uniformly applied to the gasket.

One such pipe repair clamp is shown and described in U.S. Pat. No. 4,676,275. According to that patent, a gasket in the form of a sealing cartridge is enclosed within the confines of a metallic outer strip or band, to the ends of which, lugs have been secured. The sealing cartridge is comprised of a cylindrical axially extending gasket which has an axially extending hinge portion integral with and of the same material as the gasket and which is axially split or disconnected so as to provide axially extending free end portions at a point approximately 180° displaced from the hinge portion. Two armor sleeves of substantially semi-cylindrical shape and co-extensive in axial length with the gasket are bonded to the exterior of the gasket. Each sleeve extends from the region of the hinge portion to a point just short of a respective free end of the gasket with which it is associated. With this arrangement, the free ends of the cartridge, that is the free ends of the gasket and armor sleeves, may be rotated about the hinge portion without deformation of the sleeves to permit the cartridge to be mounted on the pipe to be repaired or the pipes to be joined together. On the pipe, the free ends of the cartridge are brought together and the exterior metallic band is mounted around the cartridge and stress applied thereto by tightening the lug bolts.

Since the metallic outer strip of the sealing cartridge is disconnected to provide free end portions at diametrical points on the gasket, the clamping band must be carefully aligned with the cartridge to ensure that the clamping band will exert confining pressure on the exposed portions of the gasket. If the band is misaligned the gasket will tend to extrude at the hinge portion or at the portion where the free ends of the gasket meet. Furthermore, even if the clamping band is properly positioned during the initial stages of installation, the band may become displaced as the clamping bolt is tightened.

SUMMARY OF THE INVENTION

According to the invention a pipe repair clamp is provided which includes a hollow, cylindrical split compression gasket having axially extending end portions. The end portions terminate in end faces which define a relatively small axially extending gap when the gasket is initially installed on a pipe to be repaired. An arcuate armor sleeve is mounted on the outside surface of a first portion of the gasket and has axially extending ends arcuately spaced unequal distances from the end faces of the gasket. A clamping band encircles the gasket and the armor sleeve. Lugs are provided at the end of the clamping band which cooperate with a bolt to apply tension to the band so that the band exerts compressive force on the gasket and the sleeve. The band is in contact with a second portion of the gasket when the band and gasket are initially installed on a pipe to be repaired and are out of contact with second and third portions of the gasket. The third portion of the gasket includes at least one of the end portions which terminate in the end faces of the gasket so that when compressive force is exerted by the band, the gap will be closed by abutment of the faces and the second and third portions of the gasket will be substantially eliminated. Indicia are provided on the armor sleeve so that the clamping band may be initially aligned in a proper location with respect to the armor sleeve but the initial alignment of the band and the sleeve is not as critical as prior art arrangements since the gasket and sleeve are arranged so that the material of the gasket may flow into predetermined spaces as the clamping is tightened on the sleeve and gasket.

DETAILED DESCRIPTION OF THE INVENTION

Figure 1:
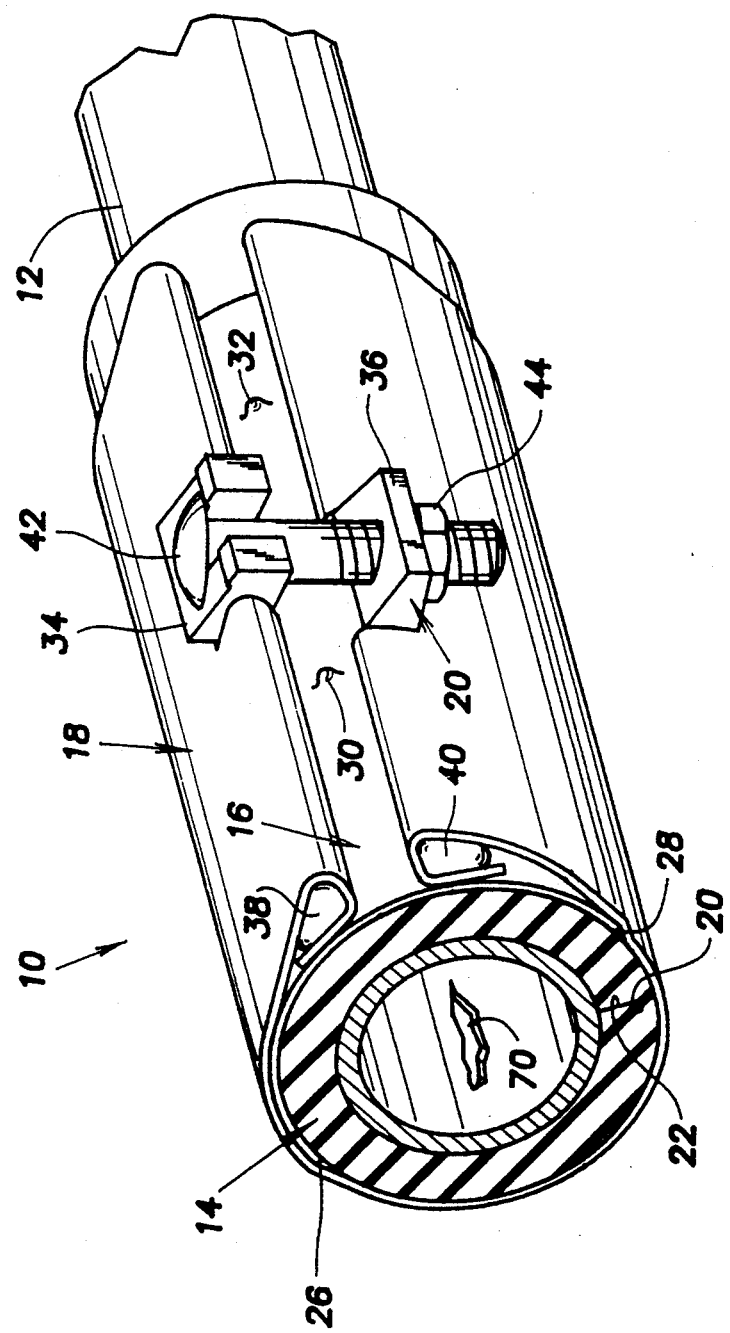
FIG. 1 is a perspective view of a pipe repair clamp in accordance with this invention showing the clamp in an installed condition.

Referring now to the drawings, there is illustrated a pipe repair clamp 10 according to this invention mounted on a pipe 12. The clamp 10 includes a gasket 14, an arcuate armor sleeve 16, a clamping band 18, and a tensioning assembly 20. The gasket 14 is preferably buna-n rubber or an equivalent compound compatible with rubber base or cyanoacrylate-type rubber glues, sealants, or adhesives. The gasket is manufactured in relatively long lengths, such as 36-inch lengths, and cut to a suitable length, for example, three inches. The gasket is slit longitudinally to provide spaced end faces 20 and 22 which define a gap 24 when the gasket 14 is initially installed on a pipe to be repaired. The armor sleeve 16 is cemented to the gasket 14 by a suitable rubber base or cyanoacrylate-type adhesive. The armor sleeve is arcuate and preferably defines an arc of 180°. The sleeve 16 has axially extending ends 26 and 28 and also includes projecting dimples 30 and 32 which are axially aligned and which are located mid-way between the ends 26 and 28.

The clamping band 18 encircles the gasket 14 and the sleeve 16 and is tensioned by the tensioning assembly 20. The assembly 20 includes a yoke 34 and an apertured lug 36. The yoke 34 has axially extending arms 38 and the lug 36 has axially extending arms 40 which are parallel to the arms 38. The ends of the band 18 are wrapped around the arms 38 and 40 so that they are interposed between the arms 38 and 40 and the armor sleeve 16. A tensioning bolt 42 having a nut 44 extends between the Yoke 34 and the lug 36 so that the ends of the clamping band may be drawn together as the nut 44 is tightened.

Figure 2:
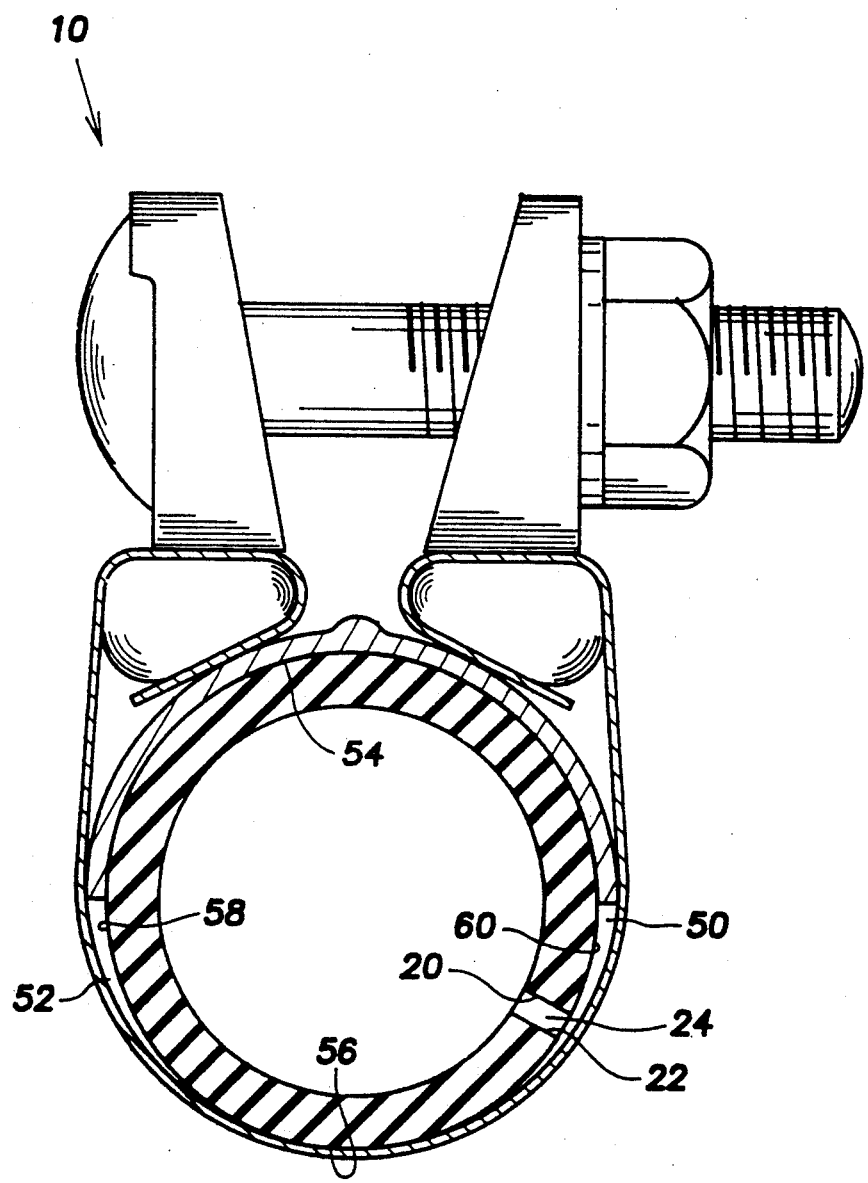
FIG. 2 is a cross section of a clamp illustrating the clamp in an installed but pretensioned condition.

Referring particularly to FIG. 2, the pipe repair clamp 10 is illustrated in a position wherein the clamping band is initially positioned on the pipe 12 with the nut 44 in a finger-tight condition. It may be noted that in this condition, there exists the gap 24 between the ends 20 and 22 and there exists arcuate spaces 50 and 52 which extend from the ends 26 and 28 of the sleeve 16. With the sleeve 16 mounted on a first portion 54 of the gasket 14, the band is initially in contact with a second portion 56 of the gasket which extends between the spaces 50 and 52. The band 18 is out of contact with third and fourth portions 58 and 60 of the gasket. The fourth portion 60 includes the portion of the gasket 14 which terminates in the end face 20.

With the pipe repair clamp 10 mounted in the previously described condition and in the illustrated position by using the dimples 30 and 32 as a visual or tactile guide, the nut 44 is tightened to draw the clamping band 18 radially inwardly with respect to the pipe 12. Initial pressure exerted on the gasket 14 causes the gasket to flow within the confines of the sleeve 16 and band 18 to close the space 24 between the faces 20 and 22 and to fill the spaces 50 and 52. Once these spaces are filled with the compressed gasket, uniform sealing pressure is exerted on the pipe 12 to seal a damaged area 70 of the pipe 12.

Although the preferred embodiment of this invention has been shown and described, it should be understood that various modifications and rearrangements of the parts may be resorted to without departing from the scope of the invention as disclosed and claimed herein.

What is claimed is:

1. A pipe repair clamp assembly for repairing leaks in piping, said clamp assembly comprising a pipe to be repaired, a hollow, cylindrical slit compression gasket surrounding a portion of said pipe to be repaired, said gasket having axially extending end portion terminating in end faces which define a relatively small, axially extending gap, an arcuate armor sleeve mounted on an outside surface of a first portion of said gasket and having axially extending ends arcuately spaced unequal distances from the end faces of said gasket, a clamping band encircling said gasket and said sleeve, said band being in contact with a second portion of said gasket and out of contact with third and fourth portions of said gasket, said fourth portion of said gasket including at least one of said end portions which terminate in said end faces, means to exert compressive force on said gasket to close sad gap and to cause compressive contact between said clamping band and said second and third portions and to thereby exert a uniform sealing pressure on said pipe.

2. A pipe repair clamp according to claim 1 wherein said fourth portion includes both said end portions.

3. A pipe repair clamp according to claim 1 wherein said means to apply tension to said band includes lugs attached to each end of said band and bolt means extending through said lugs to draw said lugs together.

4. A pipe repair clamp according to claim 3 wherein said lugs are positioned equidistantly from the axially extending ends of said sleeve.

5. A pipe repair coupling according to claim 4 wherein axially aligned indicia means are provided on said sleeve mid-way between said axially extending end portions of said sleeve of said sleeve to facilitate proper alignment of said lugs with said mid-portion.

6. A pipe repair coupling according to claim 5 wherein said indicia means are raised dimples.

7. A pipe repair coupling according to claim 1 wherein said sleeve extends through an arcuate distance of b 180°.

8. A pipe repair coupling according to claim 7 wherein said sleeve is adhesively secured to said gasket.

* * * * *